United States Patent [19]
Ohashi

[11] Patent Number: 5,801,966
[45] Date of Patent: Sep. 1, 1998

[54] MACHINE VISION METHODS AND ARTICLES OF MANUFACTURE FOR DETERMINATION OF CONVEX HULL AND CONVEX HULL ANGLE

[75] Inventor: Yoshikazu Ohashi, Framingham, Mass.

[73] Assignee: Cognex Corporation, Natick, Mass.

[21] Appl. No.: 506,295

[22] Filed: Jul. 24, 1995

[51] Int. Cl.$^6$ .................... G06R 9/00; G01B 11/24
[52] U.S. Cl. .................. 364/559; 382/145; 382/199; 382/203
[58] Field of Search ............... 364/559; 382/145, 382/146, 147, 199, 203

[56] References Cited

U.S. PATENT DOCUMENTS

| | | | |
|---|---|---|---|
| 3,936,800 | 2/1976 | Ejiri et al. | 382/18 |
| 3,968,475 | 7/1976 | McMahon | 382/18 |
| 4,115,702 | 9/1978 | Nopper | 382/48 |
| 4,200,861 | 4/1980 | Hubach et al. | 382/34 |
| 4,254,400 | 3/1981 | Yoda et al. | 382/18 |
| 4,441,206 | 4/1984 | Kuniyoshi et al. | 382/8 |
| 4,630,306 | 12/1986 | West et al. | 382/21 |
| 4,688,088 | 8/1987 | Hamazaki et al. | 358/101 |
| 4,736,437 | 4/1988 | Sacks et al. | 382/34 |
| 4,771,469 | 9/1988 | Wittenburg | 382/203 |
| 4,783,826 | 11/1988 | Koso et al. | 382/8 |
| 4,783,828 | 11/1988 | Sadjadi | 382/21 |
| 4,860,374 | 8/1989 | Murakami et al. | 382/48 |
| 4,876,728 | 10/1989 | Roth | 382/8 |
| 4,907,169 | 3/1990 | Lovoi | 382/8 |
| 4,922,543 | 5/1990 | Ahlbom et al. | 382/48 |
| 4,926,492 | 5/1990 | Tanaka et al. | 382/18 |
| 4,955,062 | 9/1990 | Terui | 382/8 |
| 4,959,898 | 10/1990 | Landman et al. | 29/705 |
| 4,962,423 | 10/1990 | Yamada et al. | 358/101 |
| 4,972,359 | 11/1990 | Silver et al. | 364/728.5 |
| 5,073,958 | 12/1991 | Imme | 382/22 |
| 5,081,656 | 1/1992 | Baker et al. | 382/8 |
| 5,086,478 | 2/1992 | Kelly-Mahaffey et al. | 382/8 |
| 5,091,861 | 2/1992 | Geller et al. | 364/474.34 |
| 5,113,565 | 5/1992 | Cipolla et al. | 382/8 |
| 5,133,022 | 7/1992 | Weideman | 382/18 |
| 5,134,575 | 7/1992 | Takagi | 364/559 |
| 5,159,645 | 10/1992 | Kumagai | 382/198 |
| 5,206,820 | 4/1993 | Ammann et al. | 364/559 |
| 5,243,607 | 9/1993 | Masson et al. | 395/185.02 |
| 5,371,690 | 12/1994 | Engel et al. | 364/570 |
| 5,519,840 | 5/1996 | Matias et al. | 395/375 |
| 5,583,949 | 12/1996 | Smith et al. | 382/199 |

OTHER PUBLICATIONS

Grimson, Member, Ieee and Huttenlocher, *On the Sensitivity of the Hough Transform for Object Recognition*, , pp. 255–274, May 1990.

Grimson, Member, Ieee and Huttenlocher, *On the Sensitivity of the Hough Transform for Object Recognition*, 1990, pp. 123–131.

*Primary Examiner*—Edward R. Cosimano
*Attorney, Agent, or Firm*—David J. Powsner

[57] ABSTRACT

A machine vision method for identifying a convex hull (i.e., a perimeter) around a set of points (e.g., such as may be found in an image of a ball grid array, or BGA, device) involves finding several "extreme" points on the convex hull. Points in the set that are outside a closed polygon defined by those extreme points are ordered to form a hull by, sorting them, identifying a line defined certain minimum and maximum coordinate values, and re-ordering the sorted points according to their position with respect to that line. The method further calls for testing successive points on the hull and removing those that do not define a convex hull using aspects of a Graham scan technique. The invention also provides a method for finding the angular orientation of a convex hull. The methods of the invention can be beneficially applied to the inspection of images of ball grid array devices, as well as other machine vision applications.

18 Claims, 8 Drawing Sheets

ORIGINAL POINT SET

*FIG. 7A*

REMOVE INTERNAL POINTS

HORIZONTALLY SORTED LIST
1 2 3 4 5 6 7

1 4 5 6 7 3 2
MOVE POINTS BELOW LINE (POINTS 2 & 3) TO END OF LIST

*FIG. 7F*

FIG. 7G

MACHINE VISION METHODS AND ARTICLES OF MANUFACTURE FOR DETERMINATION OF CONVEX HULL AND CONVEX HULL ANGLE

BACKGROUND OF THE INVENTION

The invention pertains to machine vision and, more particularly, to methods and articles of manufacture for analyzing point sets to identify convex hulls and convex hull angles.

In automated assembly processes, such as those for assembling electronic circuit boards, it is important to determine the exact location of components prior to their placement for final assembly. For example, an assembly system must know the axial position and angular orientation of each component before placing its leads on appropriate solder pads of a printed circuit board.

Accuracy in positioning is ever more critical as the size of the electronic components decrease and the number of conductive leads increase. Such is the case with ball grid array (BGA) devices. These are small surface mounted devices containing tens or hundreds of conductive solder "bumps" arranged in regular patterns, e.g., rectangular arrays, "checker boards", et cetera. Because the bumps are so closely spaced, accurate placement and alignment with solder pads on the circuit board is imperative.

The art suggests a few approaches to determining the orientation of BGA devices. These approaches are primarily binary techniques based on "blob" analysis of the solder bump array images. A drawback of the approaches is that, due to their binary nature, they are highly susceptible to lighting conditions or device-to-device variations. Moreover, they require that correspondence steps be performed to remove extraneous features, or noise. Those correspondence steps are typically very time consuming. While some approaches have attempted to reduce that time by limiting the correspondence step to a small subset of the bumps, those approaches suffer reduced accuracy.

Difficulties in locating arrays of small, closely spaced objects are not limited to BGA device inspection. They are also present in a number of machine vision applications, e.g., flip-chip IC's, large leaded IC's and various connectors. A class of software tools, referred to as "point set" tools, are provided by the art for analyzing such arrays.

One point set tool, the "convex hull," can be used to find the perimeter of a set of points. More particularly, it can be used to find the smallest convex polygon (i.e., a polygon with no reentrant vertices) that encloses all points in a point set. More intuitively, if the points in a set are represented by nails, the convex hull is a polygon formed by a string when it is wrapped around those nails.

In his book, *Algorithms in C* (Addison-Wesley, 1990), Sedgewick describes two techniques for finding a convex hull: a package-wrapping technique and a Graham scan technique. See, Sedgewick, at Chapters 24 and 25, pp. 347, et seq, the teachings of which are incorporated herein by reference.

Package-wrapping involves finding a point on the hull (e.g., a point with the smallest y-axis coordinate value), sweeping a positive horizontal array from that point upward until it hits a second point, which is presumed to lie on the hull as well. From that second point, another positive horizontal array is swept upward to find a third point on the hull, and so forth. The technique continues in this manner until all perimeter points are found. A drawback of the package-wrapping technique described by Sedgewick is its use of a time consuming theta function for computing angles.

The Graham scan technique described by Sedgewick involves constructing a simple closed polygon from the points in a set. This is done by sorting them, using as keys the theta function, and then progressing point-by-point around the polygon to remove points not on the hull. This latter step is based on determining which direction the perimeter segments "turn" at each vertex. Vertex points that turn left are presumed to be on the hull, while vertex points that cause a right turn are not. A drawback of the Graham scan technique disclosed by Sedgewick is that it fails to meet the speed requirements of machine vision applications. This results, in part, from Sedgewick's use of the theta function as well as from exhaustive examinations of triangles formed by three points.

An object of this invention is to provide improved methods for machine vision analysis and, particularly, improved methods for point set analysis.

A more particular object of this invention is to provide improved methods for finding the convex hull of a set of points. A related object is to find the angle of such a convex hull.

Still another object is to provide such methods that can be readily adapted for use in ball grid array (BGA) inspection, as well as in other machine vision applications involving point sets.

Yet still another object of the invention is to provide such methods that can execute quickly, and without consumption of excessive resources, on a wide range of machine vision analysis equipment.

Still yet another object of the invention is to provide articles of manufacture comprising a computer usable medium embodying program code for carrying out improved such methods.

SUMMARY OF THE INVENTION

The foregoing objects are attained by the invention which provides, in one aspect, a method for identifying a convex hull around a set of points.

The method includes finding, in the set, several starting points that reside on the convex hull. These can be points that lie on the diagonal extremes, i.e., lines that make a 45° angle to the coordinate axes and that divide the space into two regions, one of which includes all points and the other, no points. Alternatively, these can be points lying on horizontal and vertical extremes, i.e., lines that are parallel to the coordinate axes and that divide the space into two regions, one of which includes all points and the other, no points. Whether lying on the diagonal or the horizontal/vertical extremes, these points are referred to herein as the "extreme points."

The method further involves ordering, in a succession that defines a hull (though not necessarily a convex hull), points in the set that are outside a closed polygon defined by the extreme points. That polygon is, typically, a rectangle oriented vertically (in the event of horizontal/vertical extremes) or on an angle (in the event of diagonal extremes). Ordering those outside points involves sorting them in accord with their coordinate values. For example, where the points are defined in traditional planar coordinates, this involves sorting them using their x-axis coordinates as a primary key and using their y-axis coordinates as a secondary key.

The ordering steps further involves identifying a line defined by points having minimum and maximum values with respect to the primary sort key. Thus, where the x-axis coordinates are used as the primary sort key, this is a line defined by the points in the set with the minimum and maximum x-axis values. Conversely, where the y-axis coordinates are used as the primary sort key, this line is defined by the points in the set having the minimum and maximum y-axis values.

Ordering further involves reordering the sorted points according to their position with respect to that line. Thus, for example, points outside the closed polygon that are above the line are placed in order at the beginning of a sorted list, while points that are below that line are placed at the end of that list.

The result of the ordering step and its attendant sorting, line identification and reordering steps is to produce an ordered list of points defining a hull.

Following the ordering step, the method calls for testing successive points on the hull and removing those that do not define a convex hull. This testing step can be performed, by way of example, using the latter aspects of the Graham scan technique described above. Particularly, it can be performed by testing the direction of the hull perimeter at each successive vertex. Where the perimeter turns left, the vertex is presumed to lie on the convex hull and that point is retained. Conversely, where the perimeter turns right, the vertex point is presumed to lie inside the convex hull and the point is removed.

In another aspect, the invention provides a method of determining an angular orientation of a convex hull. This involves determining the internal angles of the hull. That is, identifying the angle defined by successive adjacent segments along the hull. The method further involves "folding" those internal angles into a specified range, that is, using modulo arithmetic to reduce the internal angles to a range between, e.g., −45° to +45°. The method also involves averaging the internal angles after folding. Preferably, the internal angles are weighted in accord with the length of their respective perimeter segments prior to averaging.

In yet other aspects, the invention provides articles of manufacture composed of a computer usable medium embodying a program intended to cause a computer to perform the foregoing methods.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
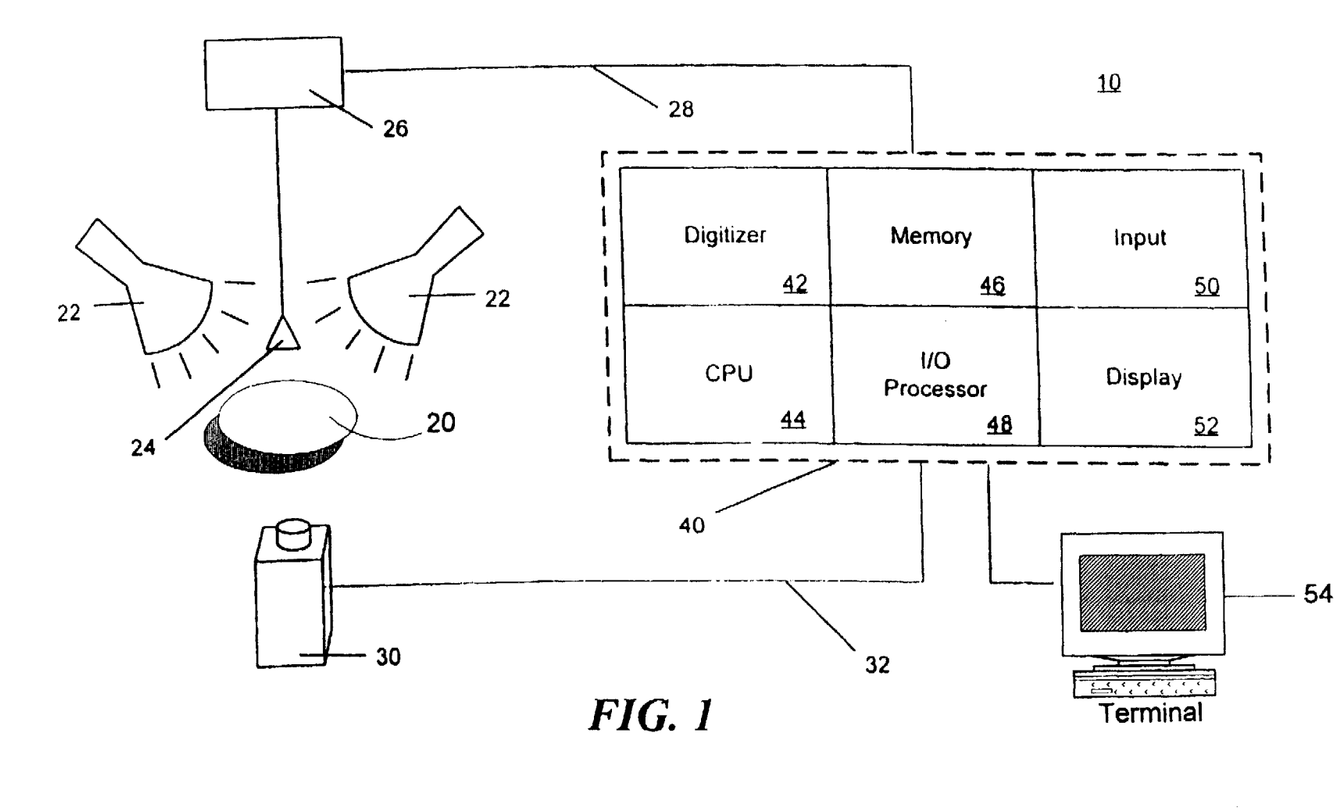
FIG. 1 is a diagrammatic representation of a machine vision system for determining the orientation of an object by image processing and analysis.

FIG. 1 is a diagrammatic representation of a machine vision system 10 for determining the orientation of an object by image processing and analysis. The system 10 includes a video camera 30 for generating a video signal 32 depicting the front of an object 20 being inspected. Lighting sources 22 provide illumination, e.g., that illuminates the object 20 from the front. A pickup device 24, such as a robotic gripper or suction nozzle, holds the object 20 during inspection. Actuator 26, such as a servo or robotic actuator, moves the pickup 24 and, thereby, the object 20.

The machine vision system 10 further includes an image analyzing system 40 for performing an automatic vision analysis of the object 20. The image analyzing system 40 determines characteristics of the object 20, such as position, boundary and orientation, based on processing and analyzing the video image signal 32 from the video camera 30.

In a preferred embodiment of the invention, image analyzer 40 represents a conventional digital data processing system having an image digitizer 42, memory 46, at least one CPU 44, and input/output processing elements 48 for interfacing the system 40 to peripheral input and output devices. The image analyzer may also include input devices 50, such as a keyboard or mouse, and output devices 52, such as a display monitor and printer as well as interface with one or more terminals 54.

Image analyzer 40 and its components 42–54 comprise any commercially available digital data processor, e.g., a personal computer or workstation, programmed for operation in accord with the teachings of this application. Preferred image analyzers 40 suitable for such programming are sold by the assignee hereof, Cognex Corporation. Those skilled in the art will appreciate that programming the analyzer 40 for operation in accord with the teachings of the invention includes storing in memory 46 (and, optionally, other computer readable storage media, such as magnetic diskettes or hard disks) a computer program that enables CPU 44 to carry out the methodology of FIG. 2 and 3.

Figure 2:
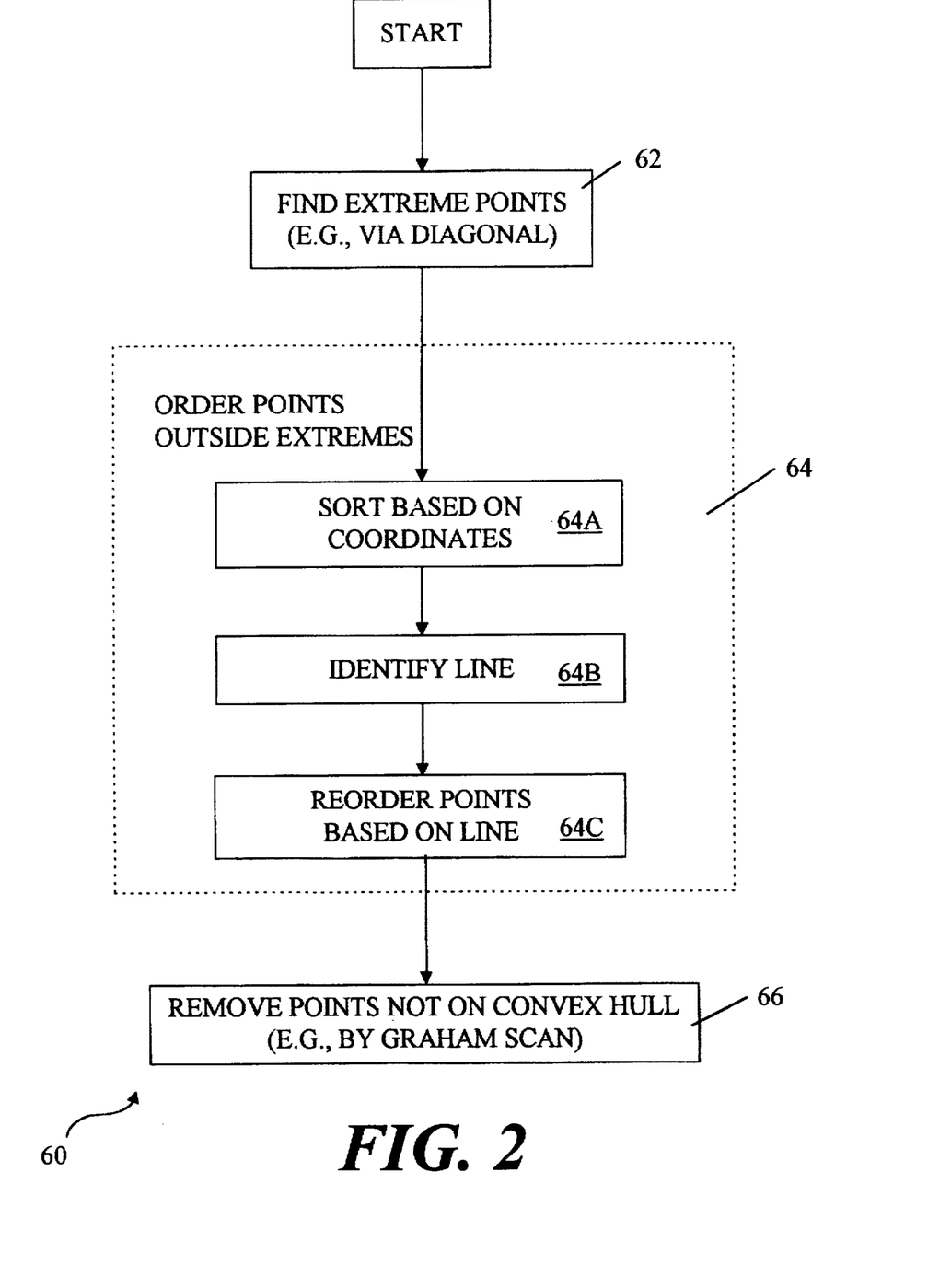
FIG. 2 depicts a method according to the invention for identifying a convex hull around a set of points.
Figure 5:
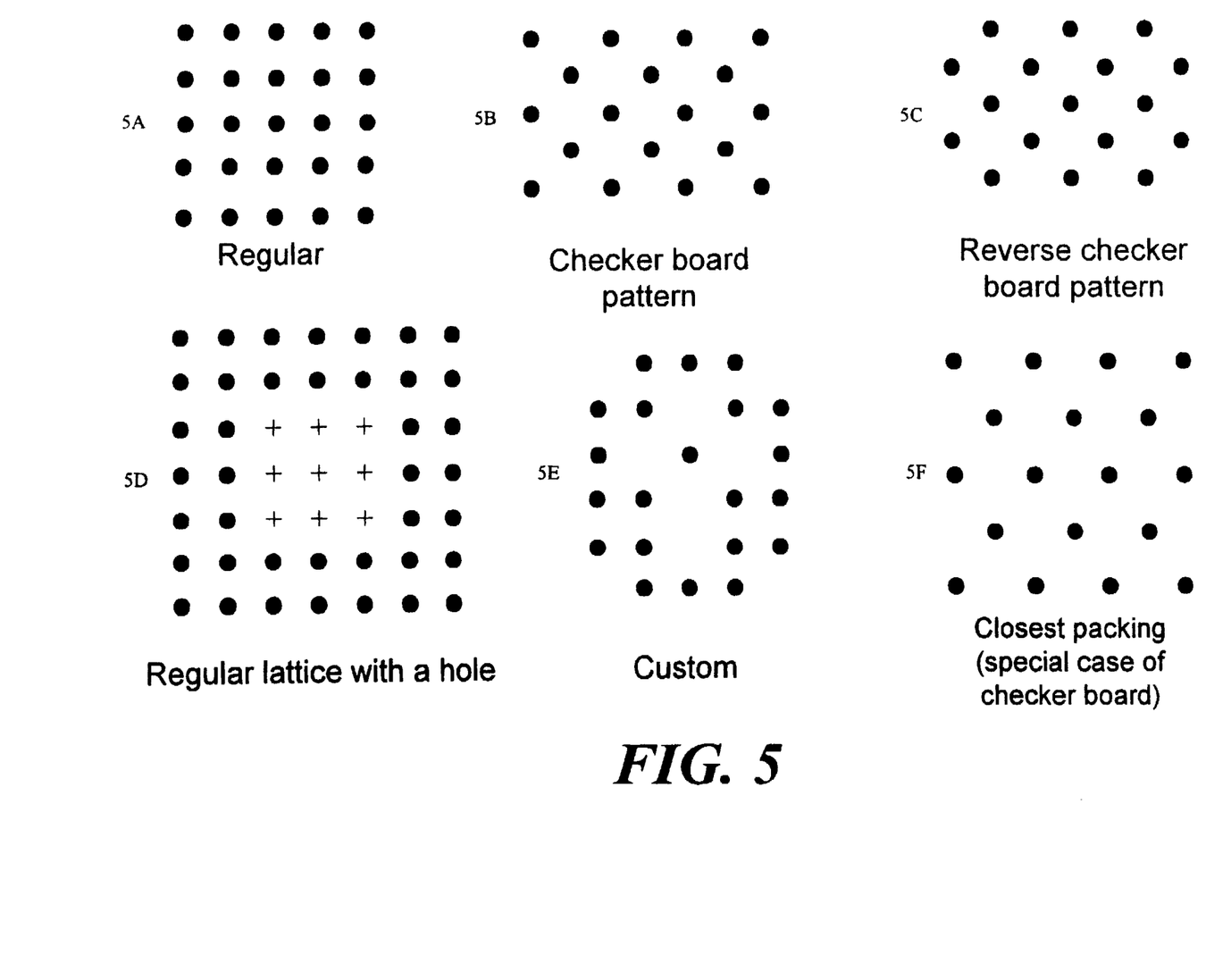
FIG. 5 illustrates conventional points sets analyzed during inspection of ball grid array (BGA) devices.

FIG. 2 depicts a method 60 according to the invention for identifying a convex hull around a set of points whose respective locations are defined by a coordinate pair, e.g., an x-axis, y-axis coordinate pair. Such a point set is graphically depicted in FIG. 7A. Though the method 60 works with any set of points, it is particularly suited for use an analyzing point sets representing observed locations of solder "bumps" on a BGA device. Typical patterns of those bumps are shown in FIG. 5.

Figure 4:
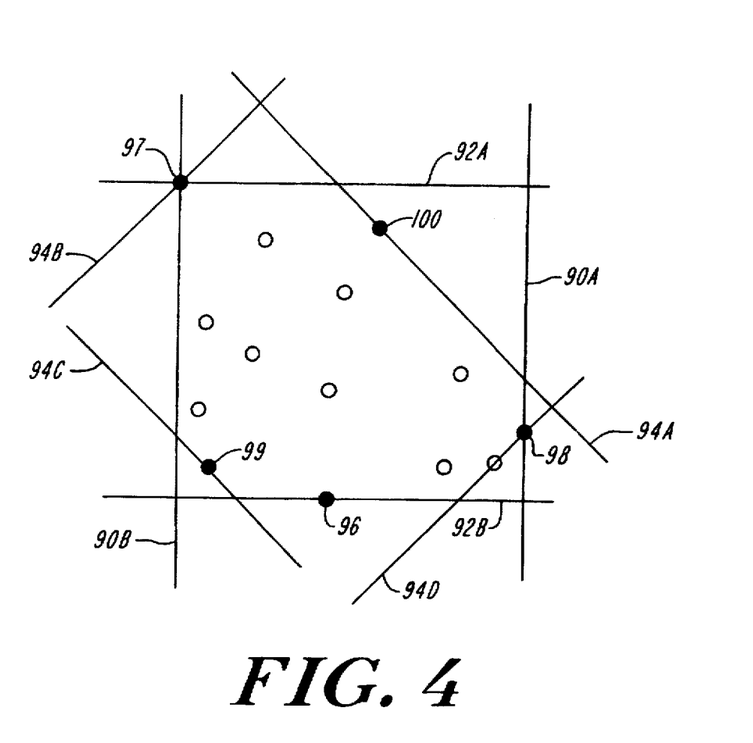
FIG. 4 illustrates application of horizontal/vertical and diagonal bounds to a point set to find "extreme" points.

In step 62, the method begins by finding several "extreme" points that reside on the convex hull. Referring to FIG. 4, this can be done by finding the points that lie on horizontal bounds 90A, 90B and vertical bounds 92A, 92B. Preferably, it is done by finding points that lie on diagonal bounds 94A, 94B, 94C, 94D. It can also be done by finding points that lie on the horizontal/vertical bounds, as well a those that lie on the diagonal bounds.

The extreme points are members of the point set itself. Referring again to FIG. 4, by applying to the point set horizontal/vertical bounds 90A, 90B, 92A, 92B, the method finds extreme points 96, 97, 98. Alternatively, by applying diagonal bounds 94A–94D, the method finds extreme points 97, 98, 99 and 100. By applying diagonal bounds 94A–94D, as well as the horizontal/vertical bounds 90A, 90B, 92A, 92B, the method finds all extreme points 96–100.

For convenience, step 62 produces four output values if horizontal/vertical bounds are applied. Thus, it generates an output value for each bound 90A (extreme point 98), bound 90B (extreme point 97), bound 92A (extreme point 97) and bound 92B (extreme point 96). Likewise, where diagonal bounds 94A–94D are applied, it generates an output value for each of bound 94A (extreme point 100), bound 94B (extreme point 97), bound 94C (extreme point 99), bound 94D (extreme point 98). Similarly, step 62 produces eight output values if diagonal bounds 94A–94D are applied along with horizontal/vertical bounds 90A, 90B, 92A, 92B.

Figure 7A:
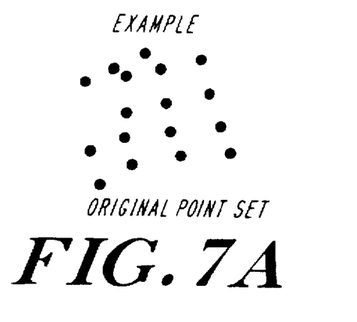
FIGS. 7A, 7B, 7C, 7D, 7E, 7F, and 7G graphically illustrate how the methodology of FIGS. 2 and 3 is used to find the convex hull from an original point set and how the internal angles of that hull are determined.
Figure 7B:
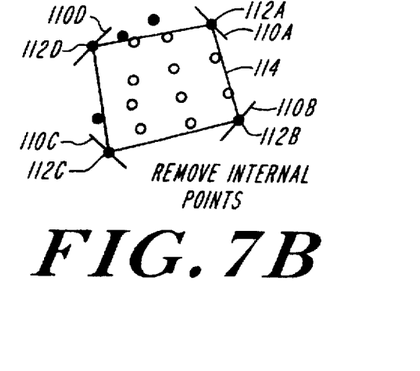

FIG. 7B illustrates application of diagonal bounds 110A–110D to the point set of FIG. 7A to identify extreme points 112A–112D.

With continued reference to FIG. 2, after the extreme points have been identified, the method 60 places in order those points lying substantially outside a closed polygon defined by the extreme points; see, step 64. The points are ordered in such a way that successive points define a closed hull (though, not necessarily a convex hull). As used herein, "substantially outside" refers to points in the set lying on, or outside the perimeter of that closed polygon, as well as those lying on the inside the perimeter but near it.

Where the extreme points lie on horizontal/vertical bounds, the closed polygon is preferably a rectangle of the type defined by lines 90A, 90B, 92A, 92B of FIG. 4. Where the extreme points lie on diagonal bounds, the closed polygon is preferably an angled rectangle of the type defined by lines 94A–94D. Where the extreme points lie on both horizontal/vertical and diagonal bounds, the closed polygon is a geometric shape as shown.

FIG. 7B illustrates a closed polygon 114 formed from extreme points 112A–112D.

To order the points, the method 60 sorts those points by their coordinate values; see, step 64A. Preferably, where the points are defined in traditional planar coordinates, this involves sorting them using their x-axis coordinates as a primary key and using their y-axis coordinates as a secondary key. Conversely, the points can be sorted using the their y-axis coordinates as a primary key and using their x-axis coordinates as a secondary key. Sorting can be carried out by any conventional mechanism, e.g., a quick sort or shell sort. Preferably, sorting is carried out using a quick sort mechanism described in *Numerical Recipes in C*, by Press, Flannery, Teukolsky and Vetterling, Cambridge University Press (1988).

Figure 7C:
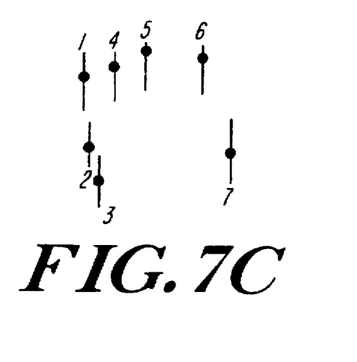

FIG. 7C illustrates the effect of sorting those point lying substantially outside polygon 114 using the x-axis values as a primary sort key and using the y-axis values as a secondary sort key. To facilitate understanding of these steps, the points are labelled 1–7.

In step 64B, the illustrated method identifies a line defined by points in the set having minimum and maximum values with respect to the primary sort key. Thus, where the x-axis coordinates are used as the primary sort key, this line is defined by the points in the set with the minimum and maximum x-axis values. Conversely, where the y-axis coordinates are used as the primary sort key, this line is defined by the points in the set having the minimum and maximum y-axis values.

Figure 7D:
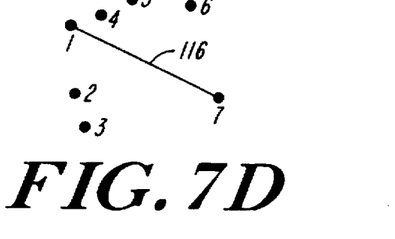

FIG. 7D illustrates a line 116 defined by points in the set having minimum and maximum values with respect to the x-axis values, i.e., points 1 and 7.

So as to finally arrange the points in a closed hull (though, again, not necessarily a convex hull), the method 60 arranges the previously sorted points according to their position with respect to the aforementioned line; see, step 64C. Particularly, where the line is defined by points with extreme x-axis values, step 64C places successive sorted points that are on or above the line in order at the beginning of a list, while placing points that are below that line at the end of such a list.

Figure 7E:
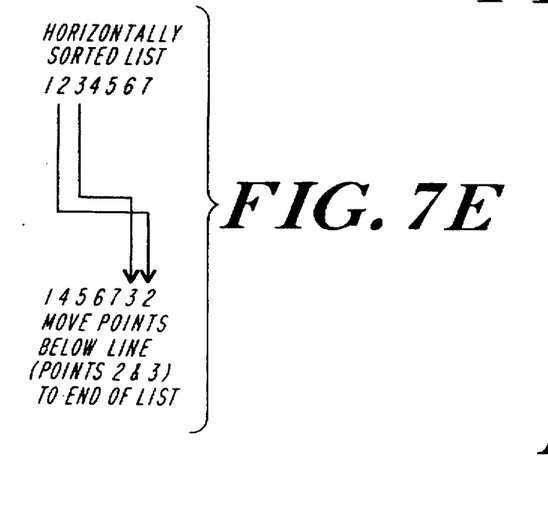
Figure 7F:
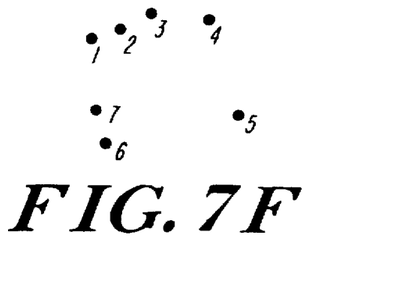

FIG. 7E illustrates the arrangement of points 1–7 effected by step 60. Here, points 2 and 3, which reside below line 116, are placed at the end of the list. FIG. 7F shows completion of the arrangement effected by step 60, to wit, the reassignment of indexes "1"–"7" so that, in succession, they define vertices of a closed hull.

In step 66, a method according to the invention tests successive points on the hull and removes those that do not define a convex hull. This testing step is preferably performed using the Graham scan technique described, by way of example, in Sedgewick, *Algorithms in C* (Addison-Wesley, 1990) at pp. 365 et seq.

More particularly, step 66 utilizes those aspects of the technique described by Sedgewick involving "proceeding around [the hull], trying to place each point on the hull and eliminating previously placed points that couldn't possible be on the [convex] hull." Id. at pp. 365. Still more particularly, step 66 involves testing the direction of the hull perimeter at each successive vertex. When the perimeter turns left, the vertex point is presumed to lie on the convex hull and that point is retained for at least the time being. Conversely, where the perimeter turns right, the vertex point is presumed to lie inside the convex hull and the point is removed.

As referred to hereinafter, the "Graham scan" technique refers to the foregoing aspects of the technique described by Sedgewick—not, the aspects described by Sedgewick as involving "constructing a simple closed polygon . . . [by sorting] the points using as keys the theta function values . . ."

Figure 7G:
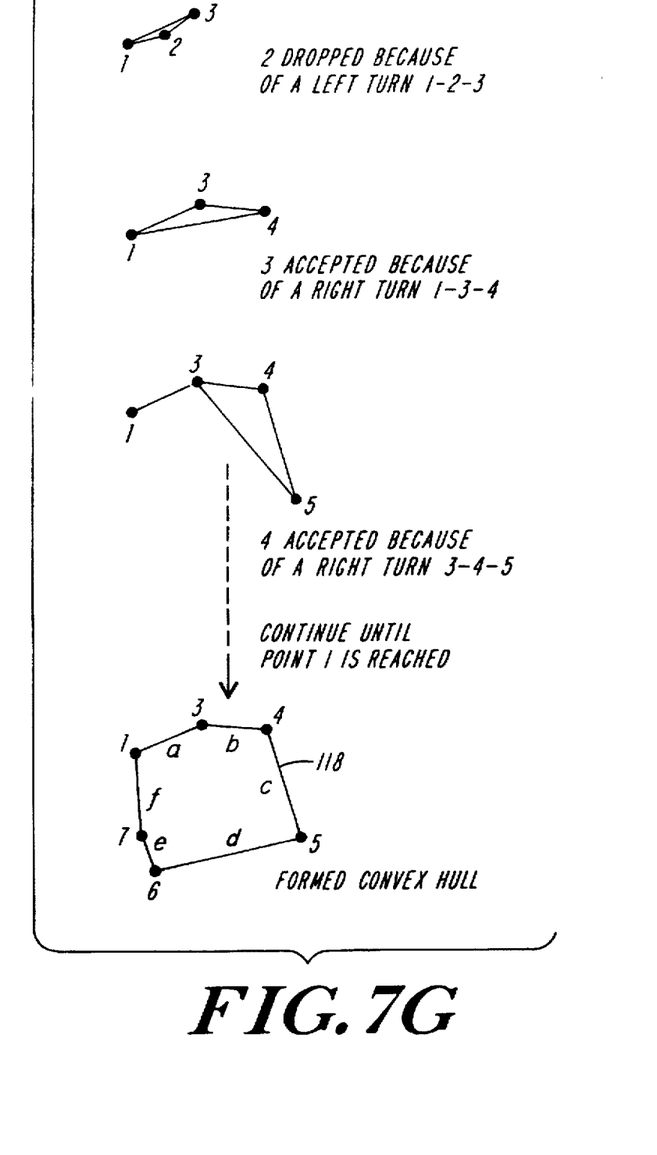

Those skilled in the art will appreciate that the Graham scan technique can be applied while "proceeding around" the hull in a clockwise or counterclockwise direction. As disclosed by Sedgewick and summarized above, a counter-clockwise progression is used. FIG. 7G illustrates the use of a clockwise progression. When proceeding in that direction, of course, vertex points defining a right turn are presumed to lie on the convex hull (and, hence, are retained for at least the time being), while those defining a left turn are presumed to lie inside the convex hull (and, hence are removed).

Following execution of step 66, the method 60 presents a list of points defining the convex hull of the original point set. These can be used, for example, in determining the location of the object comprising those points. For example, in BGA device analysis a center-of-mass analysis can be run on the convex hull to locate the center of the device for placement purposes.

FIG. 7G shows a hull 118 defining a convex hull of the original point set shown in FIG. 7A.

Figure 3:
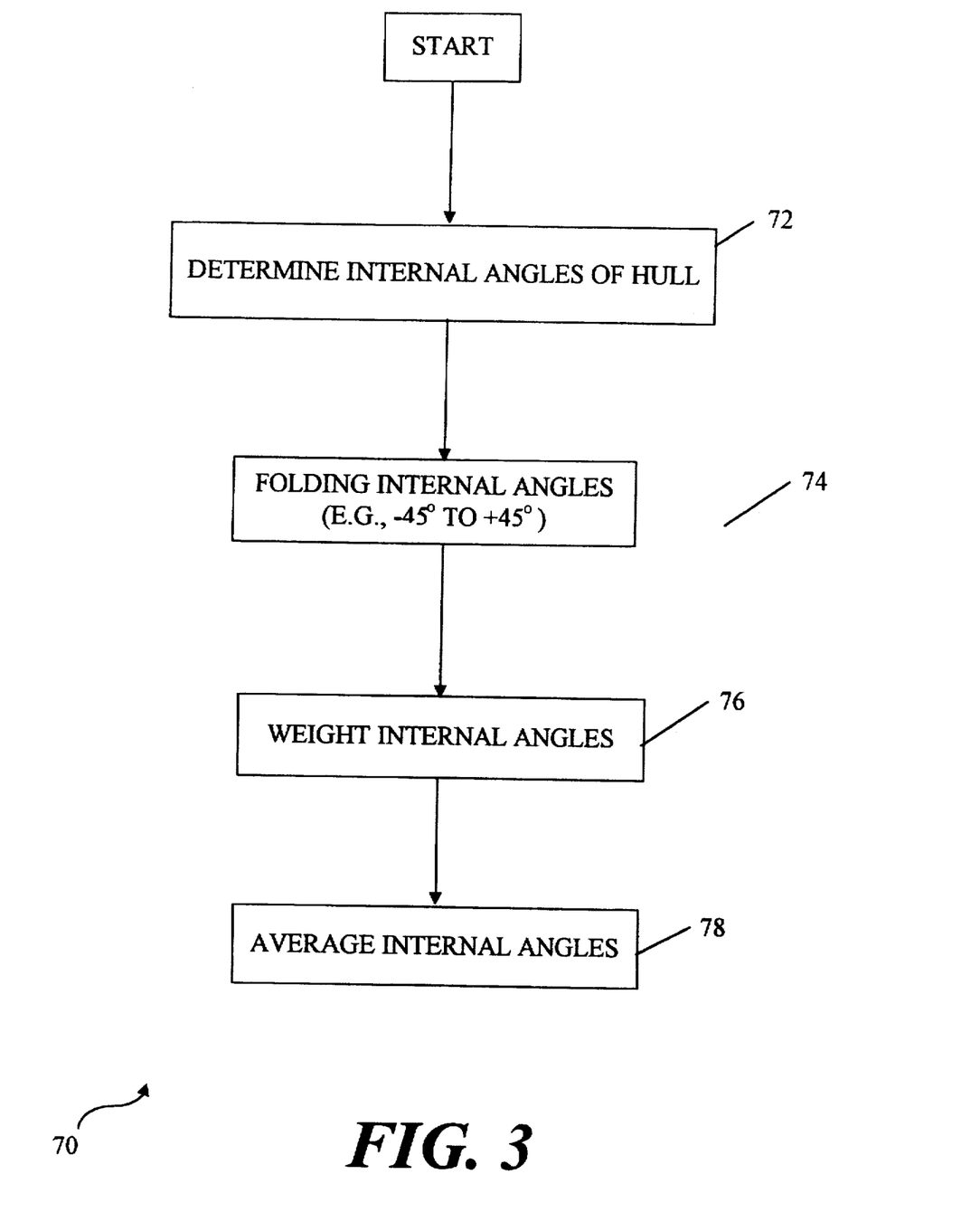
FIG. 3 depicts a method for determining the angular orientation of a convex hull.

FIG. 3 depicts a method 70 for determining the angular orientation of such a convex hull. In step 72, the method determines the internal angles of the hull, that is, the angles defined by successive adjacent segments along the hull. Those angles can be determined by conventional geometric techniques.

In step 74, the method involves "folding" those internal angles into a specified range, preferably, –45° to +45°, using modulo arithmetic. In step 76, the reduced angles are weighted in accord with the length of the respective segments. These weighted, reduced angles are, then, averaged to determine the overall orientation of the hull; see, step 78.

The table illustrates, in table form, a determination of the angular orientation of hull 18 of FIG. 7G. For purposes of the table, the sides of hull 18 are labelled a–f, as shown in FIG. 7G. For further purposes of the table, 0° is defined along the positive x-axis, 90° is defined along the negative y-axis, 180° is defined along the negative x-axis, and 270° is defined along the positive y-axis. As shown by the table, the orientation of hull 118, as determined using weighted averages, is −15°.

| Side | Direction | Folded | Weight | Wtd Ang. |
|------|-----------|--------|--------|----------|
| a | 340 | −20 | 0.15 | −3 |
| b | 0 | 0 | 0.10 | 0 |
| c | 75 | −15 | 0.22 | −3.3 |
| d | 160 | −20 | 0.30 | −6 |
| e | 240 | −30 | 0.06 | −1.8 |
| f | 265 | −5 | 0.17 | −0.85 |
| total | | | 1.00 | −14.95 |

Figure 6A:
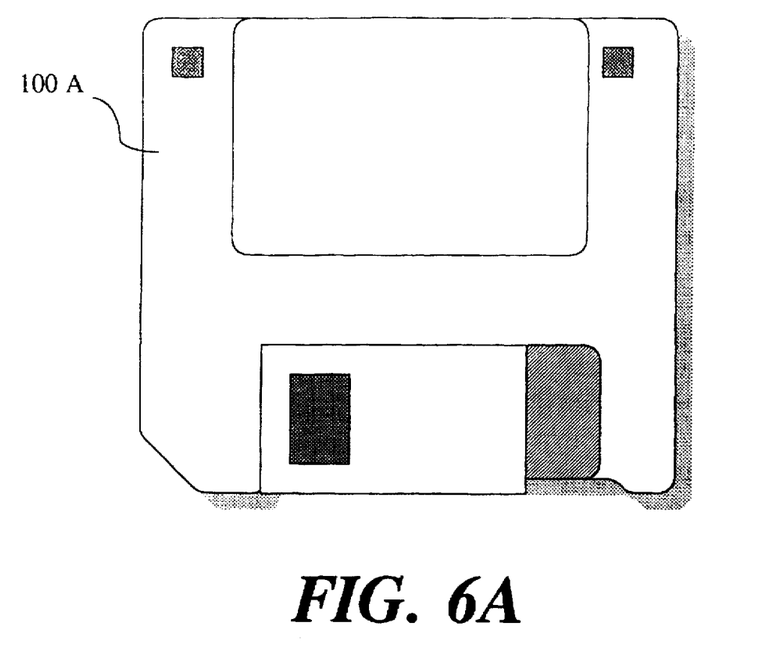
FIG. 6 illustrates an article of manufacture, to wit, a diskette, composed of a computer usable magnetic media disk embodying a program intended to cause a computer to perform methods according to the invention.
Figure 6B:
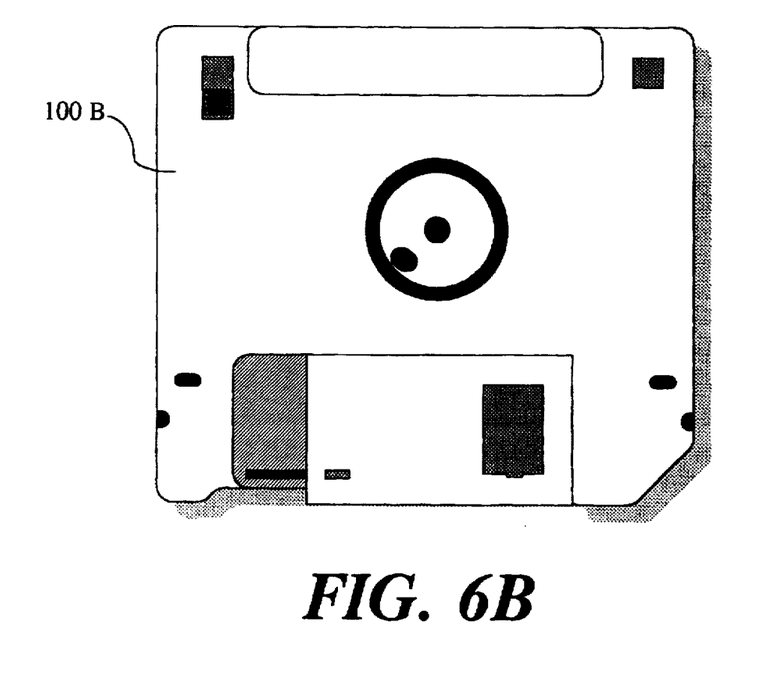

FIG. 6 depicts an article of manufacture, to wit, a magnetic diskette, composed of a computer usable media, to wit, a magnetic disk, embodying a computer program that causes image analyzing system 40, or other such digital data processing apparatus, to identify a convex hull and a convex hull angle, in accord with the methods described above in connection with FIGS. 1–5. The diskette 100 is shown in front view 100A and back view 100B. It is of conventional construction and has the computer program stored on the magnetic media therein in a conventional manner readable, e.g., via a read/write head contained in a diskette drive of image analyzer 40. It will be appreciated that diskette 100 is shown by way of example only and that other articles of manufacture comprising computer usable media on which programs intended to cause a computer to execute in accord with the teachings hereof are also embraced by the invention.

Described above are methods for determining the convex hull of a point set, as well as the angle of such a hull, meeting the objects set forth herein. Those methods can be beneficially applied to the inspection of images of ball grid array (BGA) devices insofar as the methods can quickly, and without consumption of undue computational resources, identify the position and orientation of the solder "bumps" of a BGA device. From this, the position and orientation of the device as a whole is readily discerned. Such positioning information enables equipment fabricators to precisely position the BGA device on, for example, a printed circuit board. Those methods can likewise be applied in other machine vision applications, e.g., inspection of flip-chip IC's, large leaded IC's and various connectors, to identify beneficially the convex hull and angle of point sets in their images, e.g., for device positioning. Here again, the methods permit rapid identification of the convex hull and angle without undue consumption of resources.

It will be appreciated that the embodiments described herein are not intended to be limiting, and that other embodiments incorporating additions, deletions and other modifications within the ken of one of ordinary skill in the art are in the scope of the invention.

In view of the foregoing, what I claim is:

1. A machine vision image processing method for identifying in an image a convex hull around a set of points whose respective locations are defined by at least a pair of coordinates, the method comprising finding in the set a plurality of extreme points that expected to reside on the convex hull, ordering, in a succession that defines a hull, points in the set that are outside a closed polygon defined by the extreme points, the ordering step including sorting the points that are outside the closed polygon using a first coordinate as a primary key and using a second coordinate as a secondary key, identifying a line defined by points in the set having minimum and maximum values as to the first coordinate, ordering the points that are outside the closed polygon according to their position with respect to that line as to the second coordinate, and testing successive points on the hull to remove those that do not define a convex hull.

2. A method according to claim 1, wherein the testing step comprises applying to the points on the hull a Graham scan to find and to remove those that do not define a convex hull.

3. A method according to claim 1, wherein the respective locations of the set of points are defined by a pair of planar coordinates, and wherein the finding step comprises finding points defining diagonal extremes of the set.

4. A method according to claim 1, comprising determining an angular orientation of the convex hull by determining internal angles of the convex hull, folding those internal angles into a specified angular range, and averaging those internal angles after such folding.

5. A method according to claim 4, wherein the averaging step comprises weighing the internal angles by a length of a corresponding segment on the convex hull prior to averaging.

6. A method according to claim 4, wherein the specified angular range is substantially between −45° and +45°.

7. An article of manufacture comprising a computer usable medium embodying program code for causing a digital data processor to carry out a method of identifying a convex hull around a set of points whose respective locations are defined by at least a pair of coordinates, the method comprising finding in the set a plurality of extreme points that expected to reside on the convex hull, ordering, in a succession that defines a hull, points in the set that are outside a closed polygon defined by the extreme points, the ordering step including sorting the points that are outside the closed polygon using a first coordinate as a primary key and using a second coordinate as a secondary key, identifying a line defined by points in the set having minimum and maximum values as to the first coordinate, ordering the points that are outside the closed polygon according to their position with respect to that line as to the second coordinate, and testing successive points on the hull to remove those that do not define a convex hull.

8. An article of manufacture according to claim 7, wherein the testing step comprises applying to the points on the hull a Graham scan to find and to remove those that do not define a convex hull.

9. An article of manufacture according to claim 7, wherein the respective locations of the set of points are defined by a pair of planar coordinates, and wherein the finding step comprises finding points defining diagonal extremes of the set.

10. An article of manufacture according to claim 7, comprising determining an angular orientation of the convex hull by determining internal angles of the convex hull, folding those internal angles into a specified angular range, and averaging those internal angles after such folding.

11. An article of manufacture according to claim 10, wherein the averaging step comprises weighing the internal angles by a length of a corresponding segment on the convex hull prior to averaging.

12. An article of manufacture according to claim 10, wherein the specified angular range is substantially between −45° and +45°.

13. A machine vision method of identifying in an image a convex hull around a set of points representing the solder bumps of ball grid array (BGA) device having locations defined by at least a pair of coordinates, the method comprising finding in the set of points representing the solder bumps a plurality of extreme points that are expected to reside on the convex hull, ordering, in a succession that defines a hull, points in the set representing the solder bumps that are outside a closed polygon defined by the extreme points, the ordering step including sorting the points that are outside the closed polygon using a first coordinate as a primary key and using a second coordinate as a secondary key, identifying a line defined by points in the set having minimum and maximum values as to the first coordinate, ordering the points that are outside the closed polygon according to their position with respect to that line as to the second coordinate, and testing successive points on the hull to remove those that do not define a convex hull of the set representing the solder bumps.

14. A machine vision method according to claim 13, wherein the testing step comprises applying to the points on the hull a Graham scan to find and to remove those that do not define a convex hull.

15. A machine vision method according to claim 13, wherein the respective locations of the set of points representing the solder bumps are defined by a pair of planar coordinates, and wherein the finding step comprises finding points defining diagonal extremes of the set.

16. A machine vision method according to claim 13, comprising determining an angular orientation of the convex hull of the points representing the solder bumps by determining internal angles of the convex hull, folding those internal angles into a specified angular range, and averaging those internal angles after such folding.

17. A machine vision method according to claim 16, wherein the averaging step comprises weighing the internal angles by a length of a corresponding segment on the convex hull prior to averaging.

18. A machine vision method according to claim 16, wherein the specified angular range is substantially between −45° and +45°.

* * * * *